P. V. VERNON.
APPLIANCE FOR DETERMINING THE HARDNESS OF MATERIALS.
APPLICATION FILED MAR 17, 1920.

1,369,993.

Patented Mar. 1, 1921.

P. V. VERNON.
APPLIANCE FOR DETERMINING THE HARDNESS OF MATERIALS.
APPLICATION FILED MAR 17, 1920.
1,369,993.
Patented Mar. 1, 1921.
5 SHEETS—SHEET 4.
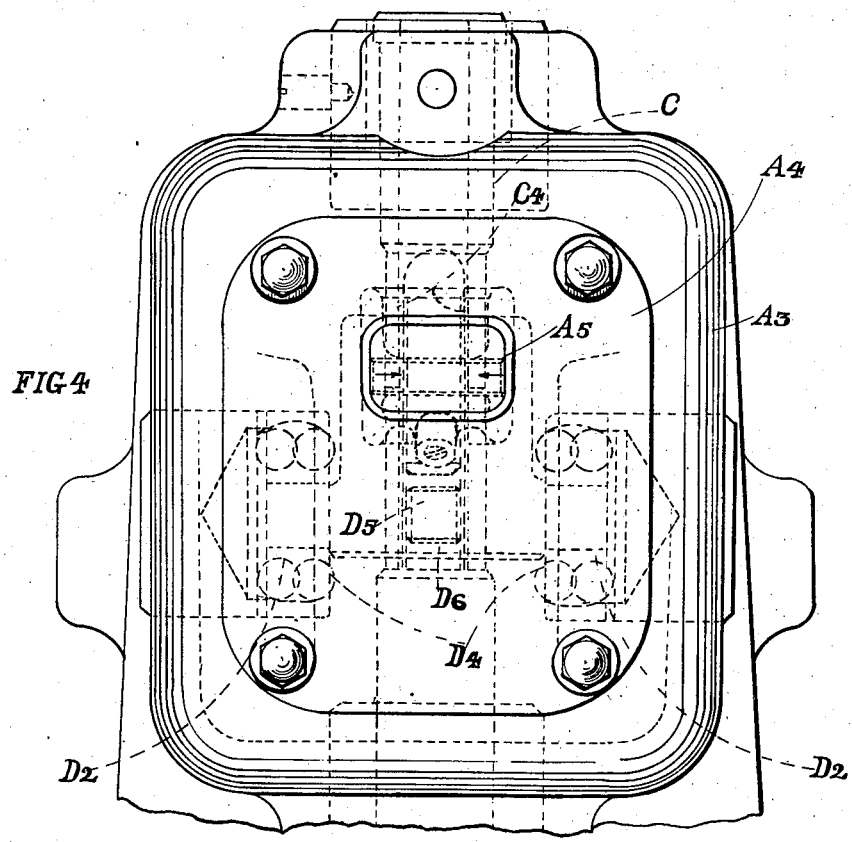
FIG 4
FIG 5
INVENTOR
Percy Venables Vernon
PER 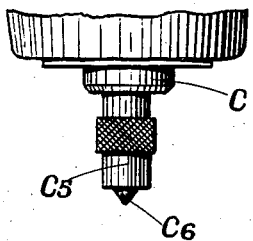
ATTORNEY P. V. VERNON.
APPLIANCE FOR DETERMINING THE HARDNESS OF MATERIALS.
APPLICATION FILED MAR 17, 1920.

1,369,993.

Patented Mar. 1, 1921.
5 SHEETS—SHEET 5.

INVENTOR
Percy Venables Vernon
PER
ATTORNEY

UNITED STATES PATENT OFFICE.

PERCY VENABLES VERNON, OF KERESLEY, ENGLAND.

APPLIANCE FOR DETERMINING THE HARDNESS OF MATERIALS.

1,369,993.     Specification of Letters Patent.     Patented Mar. 1, 1921.

Application filed March 17, 1920. Serial No. 366,523.

*To all whom it may concern:*

Be it known that I, PERCY VENABLES VERNON, a subject of the King of England, residing at Keresley, in the county of Warwick, England, have invented certain new and useful Improvements in Appliances for Determining the Hardness of Materials, of which the following is a specification.

This invention relates to appliances for determining the hardness of materials, of the kind in which an indentation is made in the surface of the test-material by the agency of an indenting tool such as a hardened ball or the like of a definite size or form and acted upon by a definite load-pressure.

It is known that with such a testing appliance, the consistency and value of the results is primarily dependent upon the "time" element in both the attainment from zero of the load and the duration of its application at its maximum value. The present invention has for its principal object to insure that such conditions are satisfied and that they are reproduced in a similar manner for each specimen tested.

Further objects are to provide an appliance which can be operated with accuracy and considerable rapidity so that tests can be made in quick succession, and without undue fatigue to the operator, and to arrange it so that no load-compensations or adjustments are required for test-pieces of varying weight or size.

According to this invention, the test-specimen and the indenting means, acting against a substantially constant load device (such as a resilient thrust member or like device constituted by a weight or a weighing machine), are thrust together by means, such as a cam, actuated by a shaft rotating at a constant speed and adapted to act so that in predetermined intervals of time, the load is applied, sustained, and withdrawn.

Preferably the load-weighing (or yielding thrust member), and the load-applying means are entirely independent of one another and act on opposite sides of the test-specimen, the former above it, and the latter below it, means being provided for adjusting the specimen in contact with the indenting means, before applying the load. Means are also combined with the foregoing parts whereby after starting each test the cam or other operative device is automatically brought to rest after it has completed its cycle of operations.

The manner of carrying out this invention is illustrated in the accompanying drawings, in which—

Figure 3:
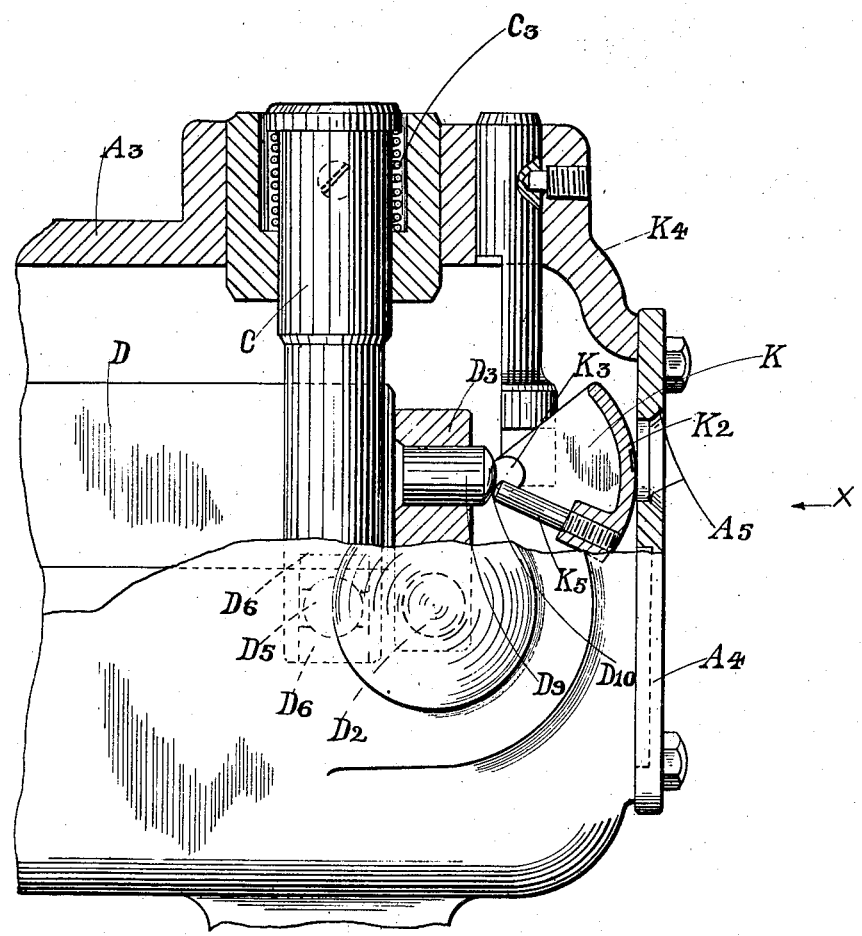

Fig. 3, to a larger scale than the foregoing is a part sectional side elevation of the portion of the appliance carrying the resilient thrust member, and Fig. 4 is a view of Fig. 3 as seen in the direction of the arrow X, while Fig. 5 shows a modified indenting device.

Figure 1:
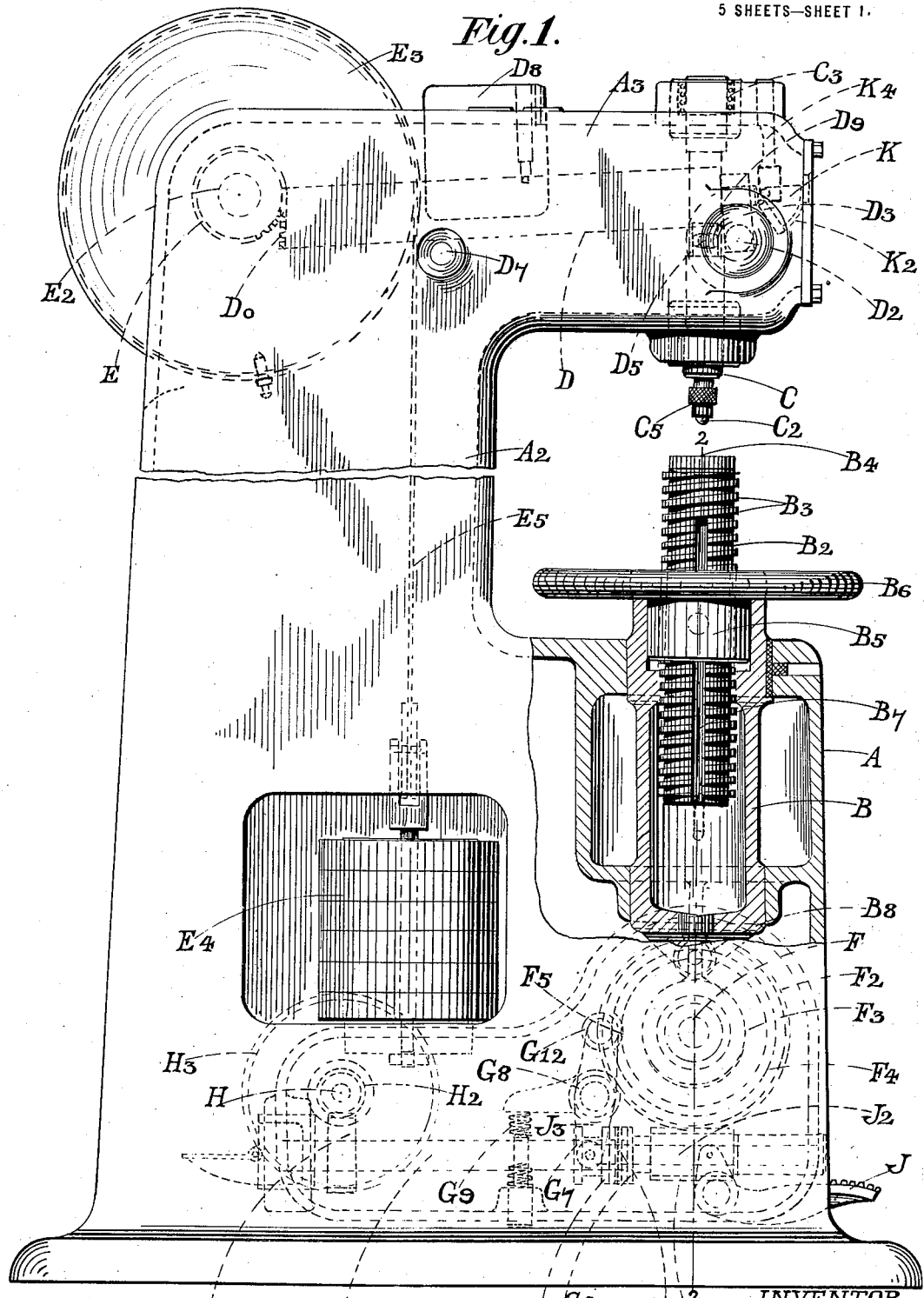
Figure 1 is a side elevation of the complete testing machine, parts of which are shown in section on a central plane.
Figure 2:
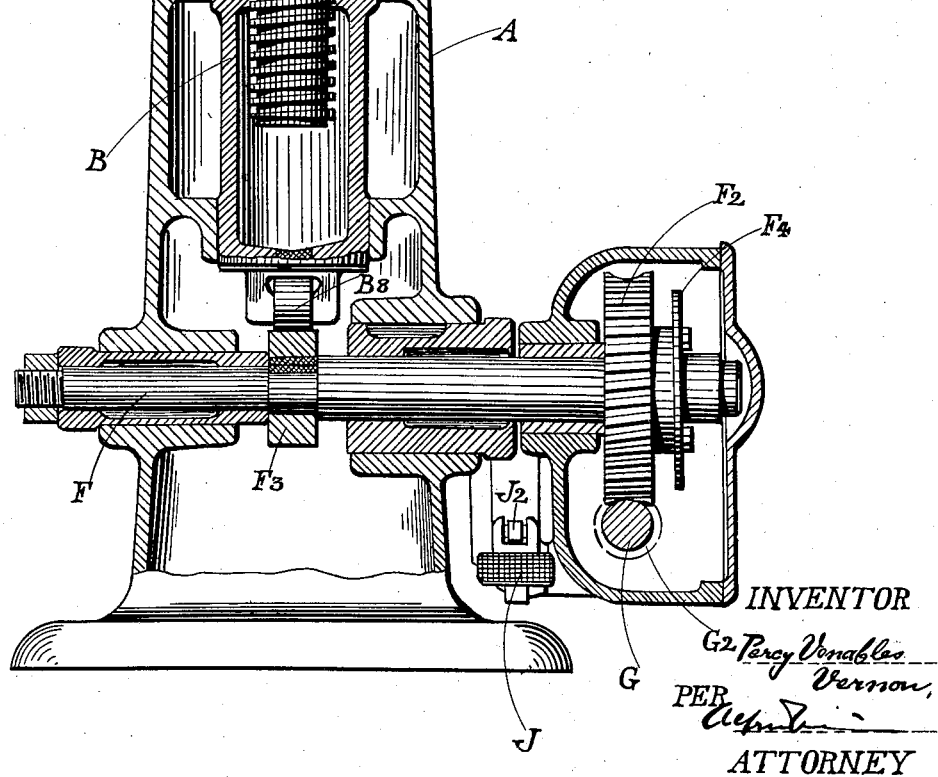
Fig. 2 is a sectional front elevation on the line 2.2. of Fig. 1.
Figure 6:
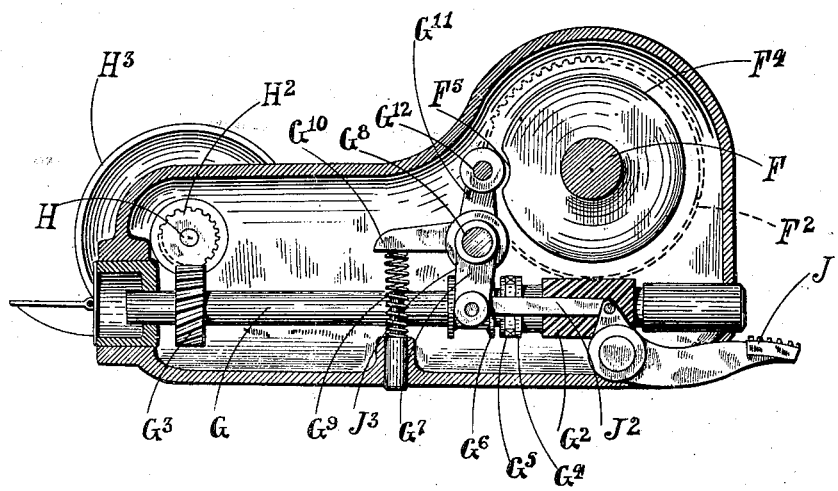

Fig. 6 illustrates in full lines the mechanism shown in dotted lines in Fig. 1.

Like letters indicate like parts throughout the drawings.

The bed A of the testing appliance carries a vertically movable ram B, constituting the load-applying member, through which extends lengthwise an adjustable pillar $B^2$ provided with an external screw thread $B^3$ adapted to take the full load thrust. On the upper end of the pillar $B^2$ is an anvil or table $B^4$ for the support of the test-specimen, and a nut $B^5$ carried by the plunger B and rotatable by means of a hand wheel $B^6$ engages the thread $B^3$ on the pillar and thus provides for adjusting the vertical height of the anvil, the pillar $B^2$ being prevented from rotating by means of a feather (not shown), in the ram B, engaging a featherway $B^7$.

Above the anvil $B^4$ is a vertically sliding plunger C constituting a resilient thrust member, in the lower end of which is provided a seating for the usual hardened steel ball $C^2$ of the known diameter, or any other type of indenting device. A screw cap $C^5$ through which the ball $C^2$ protrudes, serves to hold the latter upon its seating.

This plunger C is mounted in the free end of a hollow arm $A^3$ extending from a hollow standard $A^2$ integral with the base A of the appliance.

The weight of the plunger C is sustained normally by means of a light spring $C^3$, (for which a balance weight could be substituted if required), thereby holding it up against the operative part of a lever D which is so loaded as to resist upward movement of the plunger with a force of substantially constant magnitude. This lever is mounted within the hollow arm $A^3$ and extends from the fixed part of it and through a slot $C^4$ in the plunger to the fulcrum pins $D^2$.

For convenience, the latter are carried by a member $D^3$ attached to the lever D, and are mounted in antifriction bearings $D^4$ supported in the arm $A^3$. A hardened steel roller $D^5$ bearing upon appropriately hardened surfaces $D^6$ is interposed between the co-acting faces of the plunger C and the lever D. At the free end of the lever D is a toothed portion $D^0$ which is concentric with the axis of the fulcrum $D^2$, and engaging these teeth is a pinion E fast upon a horizontally disposed shaft $E^2$. By means of pulleys $E^3$ on the shaft $E^2$, weights $E^4$ connected by a cord $E^5$ to the rims of the pulleys $E^3$, offer a substantially constant resistance to upward movement of the ball-carrying plunger C throughout the range of its operative movement.

A stop $D^7$ is provided to limit the downward movement of the free part of the lever D, and thereby also the downward movement of the plunger C under the action of the load weights $E^4$.

For purposes of calibration and for use when the standard loading is changed (e. g. from 3000 killos. to 500 kilos), a sliding weight $D^8$ is provided upon the lever D.

A multiplying indicator is connected to the plunger C and is adapted to show clearly when the latter is at rest in its lowest position due to contact of the lever D with the stop $D^7$, and also when it is poised against the load. This indicator constitutes an important feature in the invention and will be more fully described hereunder.

Below the anvil-carrying ram B is situated a horizontally disposed shaft F adapted to be power driven to rotate at a uniform speed. This is conveniently carried out by means of a reduction gear comprising a worm wheel $F^2$ fast on the shaft F and a worm $G^2$ on a shaft G which is itself driven through skew wheels $G^3$, $H^2$. The latter wheel $H^2$ is fast on a shaft H carrying a belt pulley $H^3$ operatively connected to the power source. Carried by the shaft F is a cam $F^3$ which bears upon a cam roller $B^8$ mounted on the lower end of the ram B. This cam $F^3$ has a contour which is adapted first to raise the ram B in a pre-determined interval of time, then to hold it sustained for the required period, and thereafter to allow it to descend, all in one revolution of the said cam.

The arrangement and disposition of the mechanism for the last-mentioned purpose is as follows: The worm wheel $G^2$ is loosely mounted upon the shaft G and has at one end-face, dogs $G^4$. These are adapted to be engaged by the coöperating dogs $G^5$ on a sliding clutch member $G^6$ which, by means of a feather and featherway, (not shown), is rotationally fast on the shaft G. The sliding clutch member $G^6$ is actuated by means of an augularly movable fork $G^7$ fast on a shaft $G^8$. By the agency of a spring $G^9$ which is carried by a casing inclosing the worm and worm wheel $G^2$, $F^2$, and bears upon an arm $G^{10}$ fast on the fork carrying shaft $G^8$, the sliding clutch member $G^6$ tends always to be thrust out of engagement with the worm $G^2$.

Fast upon the shaft F is a cam $F^4$, the periphery of which is concentric with the shaft F, except only where a concave notch $F^5$ is formed in it. In this notch is adapted to lie, (when the shaft F and thus also the cam $F^2$ are at rest), a roller $G^{12}$ carried upon an arm $G^{11}$, also fast upon the fork carrying shaft $G^8$. The arrangement of these several parts is such that the cam roller $B^8$ carried by the ram B rests on the base of its cam $F^3$ when the roller $G^{12}$ lies in the notch $F^5$ of the cam $F^4$, and is there held by the thrust of the aforementioned spring $G^5$, which latter at the same time is holding the sliding clutch member $G^6$ out of engagement with the worm wheel $G^2$.

A pedal J, situated at the side of the base A of the appliance, is by means of a link $J^2$ operatively connected to an arm $J^3$ fast on the fork-carrying shaft $G^8$. When the pedal J is depressed by the attendant, the fork $G^7$ is actuated to cause the sliding clutch member to engage the worm $G^2$ and thus to cause it to be set in motion by the constantly running shaft G. At the same time the roller $G^{12}$ is withdrawn from the notch $F^5$ in the cam $F^4$, and the latter being now set in motion by the agency of the worm $G^2$, bears on the roller $G^{12}$ with its concentric periphery. The latter has a radius such that its action on the aforesaid roller holds the clutch member $G^6$ in engagement with the worm $G^2$ against the action of the spring $G^9$ without requiring sustained pressure on the pedal J. When the shaft F has made one complete revolution, during which the cam $F^3$ has performed its several functions as above set forth, the notch $F^5$ is again brought opposite to the roller $G^{12}$. The latter, under the action of the spring $G^9$, then enters the notch $F^5$, permitting at the same time, and by the same agency, the movement of the sliding clutch member $G^6$ out of engagement with the worm $G^2$ and thereby bringing the shaft F and its cam $F^3$ to rest. Thus it will be seen that after starting the test operations by actuating the pedal J, these are all performed mechanically and the operating parts are brought to rest again automatically at the conclusion of the test.

The indicating means, above mentioned, which are adapted to show when, by the upward adjustment of the table or anvil B⁴, a test piece carried upon the anvil has made contact with the indenting ball C² and taken up any lost motion in its associated parts, are shown clearly in Figs. 3 and 4. A sector shaped member K having upon it a peripheral flange K², is hinged at a point K³, constituting the center of generation of its periphery, to a supporting stud K⁴ which depends from the upper part of the arm A³ of the appliance. The hinge K³ is conveniently situated against the fulcrum end of the lever D, where the latter is provided with a reduced portion D⁹ adapted to connect to the member D³ carrying the fulcrum pins D². The end of the aforesaid reduced portion D⁹ has a rounded face D¹⁰ adapted to bear upon the end of a rod K⁵ disposed radially but somewhat to the side of the hinge K³, and having a screw threaded connection with the flange K², whereby initially it can be adjusted endwise. By means of this adjustment a line extending across the periphery of the flange K² can be brought to register with an index mark on a fixed part of the arm A³ when the lever D is resting upon its stop D².

It will be seen that when upward movement of the plunger C takes place and the lever D turns about its fulcrum pins D², the reduced part D⁹, at its end face D¹⁰, thrusts upon the rod K⁵, thus causing the sector K to turn on its hinge K³ and to bring a fresh part of the flange K² opposite the index mark above mentioned. Such part of the flange may conveniently have inscribed upon it the words "Load on." An aperture A⁵ in a cover A⁴ closing the end of the hollow arm A³ is provided opposite the flange K² of the indicator so that the latter's movements can be readily observed.

In use, the anvil B⁴, by the aid of the height adjusting means, is brought to a position appropriate for the reception of the test-specimen upon it, and is then raised to bring the latter just in contact with the ball C², and the ball also in contact with the plunger C, if any clearance exists between them, the indicator above described giving warning if any load is thereby applied through raising the anvil too high. The ram B and anvil B⁴ carrying the test-specimen are then raised by the power-driven mechanism above described, and the ball-carrying plunger C is thereby raised from its position of rest, thus resiliently exerting its loading upon the ball C² to indent the test-specimen. As will be clearly seen the essential "time" element conditions are fulfilled in the predetermined manner, and, what is of the utmost importance, are repeated in a similar manner for every specimen tested.

It is to be understood that as the time allowed for attainment of the full load from zero, and the duration of its application have different values according to the relative hardness of the metal tested, interchangeable cams F³ of various contours may be employed to meet these conditions, or change speed gearing may be employed to vary the speed of rotation of a standard type of cam.

Where other indenting means as a cone-ended punch C⁶ are desired in place of the ball C², the provision for the latter of the securing device in the form of the screw cap C⁵ with an aperture in its end part through which the active part of the indenting device protrudes, enables the exchange to be readily effected.

Thus it will be seen that the invention provides means for carrying out tests in accordance with recognized standards with accuracy and in rapid succession, all the heavy work being performed by power. The manner of applying the load is in no way influenced by the weight or size of the specimen, and the construction described provides a simple, compact and self-contained appliance.

What I claim as my invention and desire to secure by Letters Patent of the United States is:—

1. In a hardness testing machine, the combination of a support for the test-specimen, an indenting tool, and means for causing the compression of the test-specimen between said support and said indenting tool such that the attainment of full load upon the test-specimen at a definite rate, the duration of application of full load, and the complete and rapid withdrawal of the load respectively, occupy predetermined intervals of time.

2. In a hardness testing appliance, a support for the test-specimen, an indenting tool, a load-applying member adapted to cause the compression of the test-specimen between said support and said indenting tool, and a shaft rotating at uniform speed and operatively connected to the load-applying member in such manner that the attainment of full load upon the test-specimen at a definite rate, the duration of application of full load, and the complete and rapid withdrawal of the load respectively, occupy predetermined intervals of time.

3. In a hardness testing appliance, a support for the test-specimen, an indenting tool, a load-applying member acting against a yielding thrust of substantially constant value to cause the compression of the test-specimen between said support and said indenting tool; and a shaft rotating at uniform speed and operatively connected to the load-applying member in such manner that the attainment of full load upon the test-specimen at a definite rate, the duration of application of full load, and the complete and rapid withdrawal of the load respectively, occupy predetermined intervals of time.

4. In a hardness testing appliance, a vertically movable support for the test-specimen, means for adjusting the vertical height of said support, a member carrying an indenting tool and locating same opposite said support, said member being movable away from said support against a yielding thrust of a substantially constant magnitude, a shaft rotating at a constant speed; and an operative connection between said shaft and said vertically movable support whereby the latter is caused to thrust the test-specimen against the indenting tool carried by the yielding thrust member, in a predetermined interval of time and at a definite rate of application of the load, to maintain it in that position for a further predetermined interval of time, and thereafter to permit the descent of the support and the complete and rapid withdrawal of the test-specimen from contact with the indenting tool.

5. The combination with a hardness testing appliance as claimed in claim 4, of a stop limiting the movement of the yielding thrust member toward the movable support for the test-specimen, and an indicating device operatively connected to said yielding thrust member in such manner that it shows (a), when the yielding thrust is sustained by the aforesaid stop; and (b), when the yielding thrust is acting upon the test-specimen.

6. The combination with a hardness testing appliance as claimed in claim 1, of a shaft rotating at uniform speed, and a cam operatively connected to said shaft to bear on the support carrying the test-specimen to thrust said test-specimen against the indenting tool, the contour of said cam being such that predetermined periods of time are assigned to the attainment from zero to the full load applied to the test-specimen, the maintenance of full load thereon, and its subsequent removal.

7. The combination with a hardness testing appliance as claimed in claim 2, of a plunger carrying the indenting tool, and a loaded lever acting on said plunger to thrust it toward the support for the test-specimen with a force of a substantially constant magnitude.

8. The combination with a hardness testing appliance as claimed in claim 2, of a plunger carrying the indenting tool, a lever acting on said plunger to thrust it toward the support for the test-specimen, gear teeth formed on the free end of said lever in an arc concentric with the lever fulcrum, a shaft carrying a pinion engaging said gear teeth, a drum carried on said shaft and fast with said pinion, a cord attached to, and wound on said drum, and weights attached to said cord acting to cause a downward thrust of the plunger aforesaid.

9. The combination with a hardness testing appliance, as claimed in claim 1, of a shaft rotating at constant speed, a cam, a sliding dog clutch on said shaft for actuating said cam to operate the movable support for the test-specimen, for thrusting said test-specimen against the indenting tool, a spring acting on said dog clutch to disconnect rotationally said cam and said shaft, a second cam fast with the first cam and operatively connected to said dog clutch, said second cam having such contour and being connected to the dog clutch, in such manner that once every revolution it permits a movement of the dog clutch whereby rotational disengagement of the two cams aforesaid from the constant speed shaft takes place; and controllable means operable at will, for actuating the dog clutch to connect rotationally said cams with the constant speed shaft.

In testimony whereof I have signed my name to this specification in the presence of two subscribing witnesses.

PERCY VENABLES VERNON.

Witnesses:
H. F. HARRISON,
G. T. HARRIS.